United States Patent
Bruggesser et al.

(10) Patent No.: US 8,925,530 B2
(45) Date of Patent: Jan. 6, 2015

(54) INTAKE MODULE WITH INTEGRATED EXHAUST GAS RECIRCULATION

(75) Inventors: Veit Bruggesser, Hildrezhausen (DE); Hans-Peter Drespling, Heidenheim (DE); Oliver Fischer, Weinstadt-Beutelsbach (DE)

(73) Assignee: Mahle International GmbH (DE)

( * ) Notice: Subject to any disclaimer, the term of this patent is extended or adjusted under 35 U.S.C. 154(b) by 1284 days.

(21) Appl. No.: 12/761,657

(22) Filed: Apr. 16, 2010

(65) Prior Publication Data

US 2010/0263642 A1 Oct. 21, 2010

(30) Foreign Application Priority Data

Apr. 18, 2009 (DE) .......................... 10 2009 018 031
Apr. 23, 2009 (DE) .......................... 10 2009 018 378

(51) Int. Cl.
  *F02M 25/07* (2006.01)
(52) U.S. Cl.
  CPC ....... *F02M 25/0714* (2013.01); *F02M 25/0788* (2013.01); *F02M 25/0724* (2013.01); *F02M 25/0794* (2013.01); *Y02T 10/121* (2013.01)
  USPC ............ 123/568.18; 123/568.15; 123/568.17; 123/568.11
(58) Field of Classification Search
  CPC ............... Y02T 10/21; F02M 25/0724; F02M 25/0773; F02M 25/0722; F02M 35/10222
  USPC ............. 123/568.18, 568.12, 568.17, 568.23, 123/568.11
  See application file for complete search history.

(56) References Cited

U.S. PATENT DOCUMENTS

| | | | | |
|---|---|---|---|---|
| 6,044,827 A * | 4/2000 | Pfaff et al. | ............... | 123/568.18 |
| 6,343,594 B1 * | 2/2002 | Koeslin et al. | ........... | 123/568.17 |
| 6,386,188 B1 * | 5/2002 | Bender | .................... | 123/568.12 |
| 6,443,135 B1 * | 9/2002 | Dismon et al. | ........... | 123/568.18 |
| 6,758,196 B2 * | 7/2004 | Brosseau et al. | ......... | 123/568.18 |
| 7,121,268 B2 * | 10/2006 | Andoh et al. | ............. | 123/568.12 |
| 7,213,639 B2 * | 5/2007 | Danielsson et al. | .......... | 165/159 |
| 7,451,750 B1 * | 11/2008 | Fox et al. | ................. | 123/568.12 |
| 7,543,600 B2 * | 6/2009 | Berggren et al. | ............. | 137/219 |
| 8,096,289 B2 * | 1/2012 | Braun et al. | ............. | 123/568.11 |

FOREIGN PATENT DOCUMENTS

| | | |
|---|---|---|
| DE | 0869274 C | 3/1953 |
| DE | 4227739 A1 | 2/1994 |
| DE | 4325169 C1 | 9/1994 |
| DE | 4338194 A1 | 5/1995 |
| DE | 4424644 C1 | 11/1995 |

(Continued)

OTHER PUBLICATIONS

English abstract provided for EP-0869274.

(Continued)

*Primary Examiner* — Hai Huynh
*Assistant Examiner* — Gonzalo Laguarda
(74) *Attorney, Agent, or Firm* — Rader, Fishman & Grauer PLLC

(57) ABSTRACT

An integrated exhaust gas recirculation intake module comprises: an intake system including a fresh air channel; and a coupling device, wherein the coupling device is configured to receive an exhaust gas recirculation valve, wherein the coupling device is configured to connect an exhaust gas channel with a fresh gas channel, and wherein the exhaust gas channel is connected with the coupling device such that a heat transfer is hindered.

15 Claims, 2 Drawing Sheets

(56) References Cited

FOREIGN PATENT DOCUMENTS

| | | |
|---|---|---|
| DE | 10202612 A1 | 7/2003 |
| EP | 0869274 A1 | 10/1998 |
| EP | 1020635 A2 | 7/2000 |
| JP | 8-61160 | 3/1996 |
| JP | 10-299589 | 11/1998 |
| JP | 2000-130276 A | 5/2000 |
| JP | 2001-152985 A | 6/2001 |

OTHER PUBLICATIONS

English abstract provided for DE-4338194.
English abstract provided DE-10202612.
English abstract provided for EP-1020635.
Abstract provided for DE4227739.
Abstract provided for DE4325169.
Abstract provided for DE4424644.
Abstract provided for DE0869274.
English abstract for JP2001-152985.
English translation of JP Office Action dated Jan. 21, 2014 for JP 2010-096147.
English abstract for JP8-61160.
English abstract for JP10-299589, Published Oct. 11, 1998.
English abstract for JP2000-130276, Published May 9, 2000.
English translation of Japanese Advisory Action for JP2010-096147, dated May 13, 2014.

* cited by examiner

INTAKE MODULE WITH INTEGRATED EXHAUST GAS RECIRCULATION

CROSS-REFERENCES TO RELATED APPLICATIONS

This application claims priority to German patent applications DE 10 2009 018 031.1 filed on Apr. 18, 2009, and DE 10 2009 018 378.7 filed on Apr. 23, 2009, both of which are hereby incorporated by reference in their entirety.

TECHNICAL FIELD

The present invention relates to an intake module with integrated exhaust gas recirculation of an internal combustion engine, preferably of a motor vehicle. In addition, the invention relates to a method for assembling/manufacturing such an intake module.

BACKGROUND

Exhaust gas recirculation is a known principle for lowering nitrogen oxides which are generated during the combustion of fuel in combustion engines. The lowering is necessary to be able to meet the specified emission limit values. Since during the exhaust gas recirculation into a fresh air channel, that is, into an intake channel of the internal combustion engine, often high temperatures occur, up to now, it is in particular necessary to implement a connection point between the exhaust gas recirculation channel and the fresh air channel by means of a metallic housing, in particular formed from aluminum, which, on the one hand, is structurally complex and, on the other hand, is expensive to manufacture. Furthermore, such aluminum housings have the disadvantage of a complicated assembly or disassembly and are considerably heavier than an EGR-system integrated in a plastic air duct.

SUMMARY

The present invention is concerned with the problem to provide, for an intake module, an improved or at least an alternative embodiment which is in particular characterized by a simplified assembly or disassembly and a reduced weight.

According to the invention, this problem is solved by the subject matters of the independent claims. Advantageous embodiments are subject matter of the dependent claims.

The invention is based on the general idea to design, for an internal combustion engine, an intake system made of plastic with an integrated exhaust gas recirculation and to connect the associated exhaust gas channel in a communicating manner via a coupling device of the intake system with the fresh air channel of the same, wherein, at the same time, the coupling device is formed for receiving an exhaust gas recirculation valve, and wherein the exhaust gas channel of the intake module is connected with or is connectable in a heat-decoupled manner with the fresh air channel in such a manner that a particularly harmful heat transfer between the exhaust gas channel and the intake system made of plastic can be avoided or at least can be made more difficult. The intake system comprises the fresh air channel (air duct/charge air duct) and the coupling device and, for example, is composed of two or more plastic shells welded together, but can also be manufactured as one piece, e.g., as a component made by means of the lost core method. The previously described components are formed from plastic, whereas the exhaust gas channel, which also belongs to the intake module, is typically made of metal. The intake module manufactured in this manner thus has a fresh air channel and an exhaust gas channel which are connected in a communicating manner with one another by means of the intake system's coupling device formed from plastic. Apart from connecting the two channels, the coupling device according to the invention performs in addition the function to integrate the exhaust gas recirculation valve by means of which a dosing of the exhaust gas to be recirculated is carried out. To be able to reliably exclude damage to the intake system formed from plastic caused by the high temperatures within the exhaust gas channel, the exhaust gas channel is connected in a heat-decoupled manner with the coupling device of the intake system so that at least a heat transfer from the exhaust gas channel to the coupling device, which heat transfer is damaging for the intake system, can be reliably prevented. In general, with the intake module according to the invention, a coupling device previously used in this area and made of expensive aluminum can be saved which, at the same time, has the great advantage that the assembly is significantly simplified. To assemble the intake module according to the invention, the exhaust gas channel only needs to be inserted from the one side and the exhaust gas recirculation valve from the opposite side into the coupling device and they need to be connected with the same. At the same time, a significant weight reduction can be achieved with the intake module according to the invention in comparison to previous metallic solutions (typically designed as intermediate flange), which has an impact on fuel consumption and hence on pollutant emission. It is in particular conceivable that a completely prefabricated intake module consisting of intake system, exhaust gas channel, and exhaust gas recirculation valve can be provided.

In an advantageous development of the solution according to the invention, the exhaust gas channel is inserted into the coupling device of the intake system thereby forming an annular gap and is fastened thereto by means of a collar. The collar projecting from the exhaust gas channel thus provides for a further thermal decoupling between the exhaust gas channel and the coupling device in such a manner that a part of the exhaust gas channel conveying exhaust gas is not in direct contact at any point with the intake system's coupling device made of plastic. In addition, between the coupling device and the collar of the exhaust gas channel, a sealing/spacer element is arranged by means of which the collar of the exhaust gas channel and the coupling device can be attached to one another without direct contact, whereby the heat transfer is made more difficult. Between the coupling device and the collar of the exhaust gas channel is thus always an at least small gap, wherein the air contained therein acts also as an insulator. By means of the formation of the annular gap between the coupling device and the part of the exhaust gas channel inserted therein, an additional heat insulation can be achieved by means of the air layer existing there so that again no damaging heat transfer from the exhaust gas pipe to the coupling device is to be feared.

In an advantageous development of the solution according to the invention, said annular gap is formed open towards the fresh air channel and is thus vented by the same. Even a static air layer provides for a high insulation effect, wherein a vented annular gap according to the invention, that is, a gap with a flow passing through, results in a further lowering of the heat transfer between the exhaust gas channel and the coupling device, whereby the coupling device formed from plastic can be used in this area without any problem, that is, can be used in particular on a long-term basis.

In an advantageous development of the solution according to the invention, the exhaust gas channel has a wall opening in its region inserted into the coupling device, which opening has a collar optionally bent outwards which penetrates contactless at least partially into the fresh air channel. The collar is formed as a flow guiding element and redirects a portion of a fresh air flow flowing within the fresh air channel into the annular gap between the coupling device and the exhaust gas channel. Such a fresh gas redirecting causes a controlled venting of the annular gap and hence a forced cooling of the same, whereby, again, a damaging heat transfer between the exhaust gas channel's part engaging with the coupling device and the coupling device can be reliably prevented. At the same time, the collar serves for keeping the hot exhaust gas away from the annular gap because in the gap, if possible, solely fresh gas should circulate to achieve a cooling effect.

Further important features and advantages of the invention arise from the sub-claims, from the drawings and from the associated description of the Figures based on the drawings.

It is to be understood that the above mentioned features and the features yet to be described hereinafter can be used not only in the respectively mentioned combination, but also in other combinations or alone without departing from the scope of the present invention.

BRIEF DESCRIPTION OF THE DRAWING

Preferred exemplary embodiments of the invention are illustrated in the drawings and are explained in more detail in the following description, wherein identical reference numbers refer to identical or similar or functionally identical components.

In the Figures.

DETAILED DESCRIPTION

Figure 1:
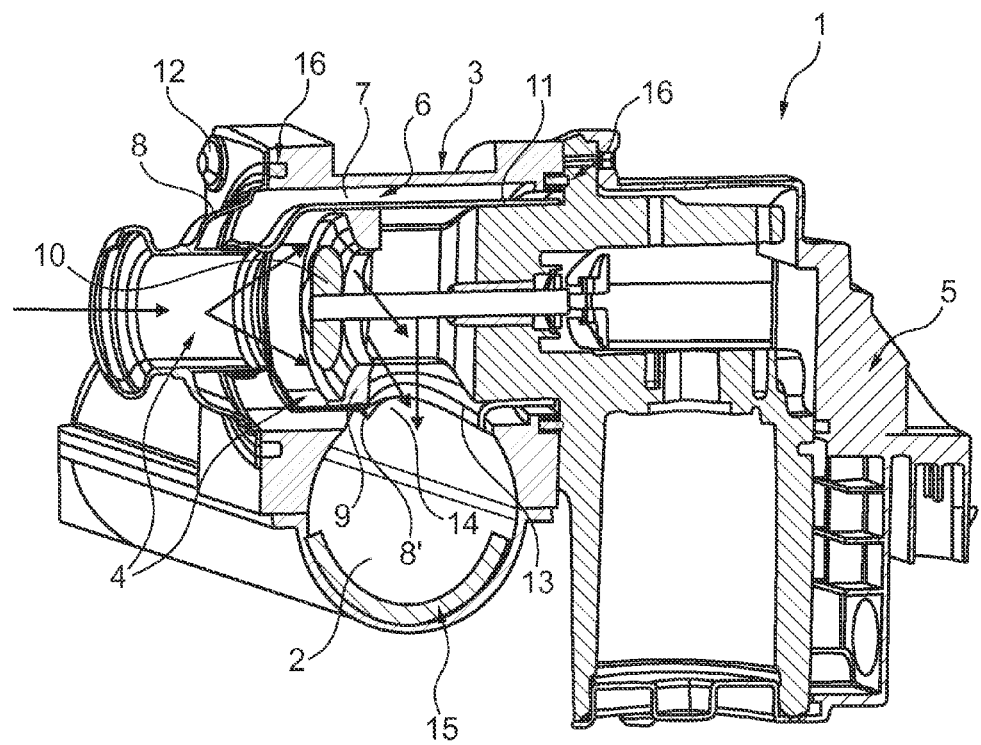
FIG. 1 shows schematically an intake module in a sectional view.
Figure 3:
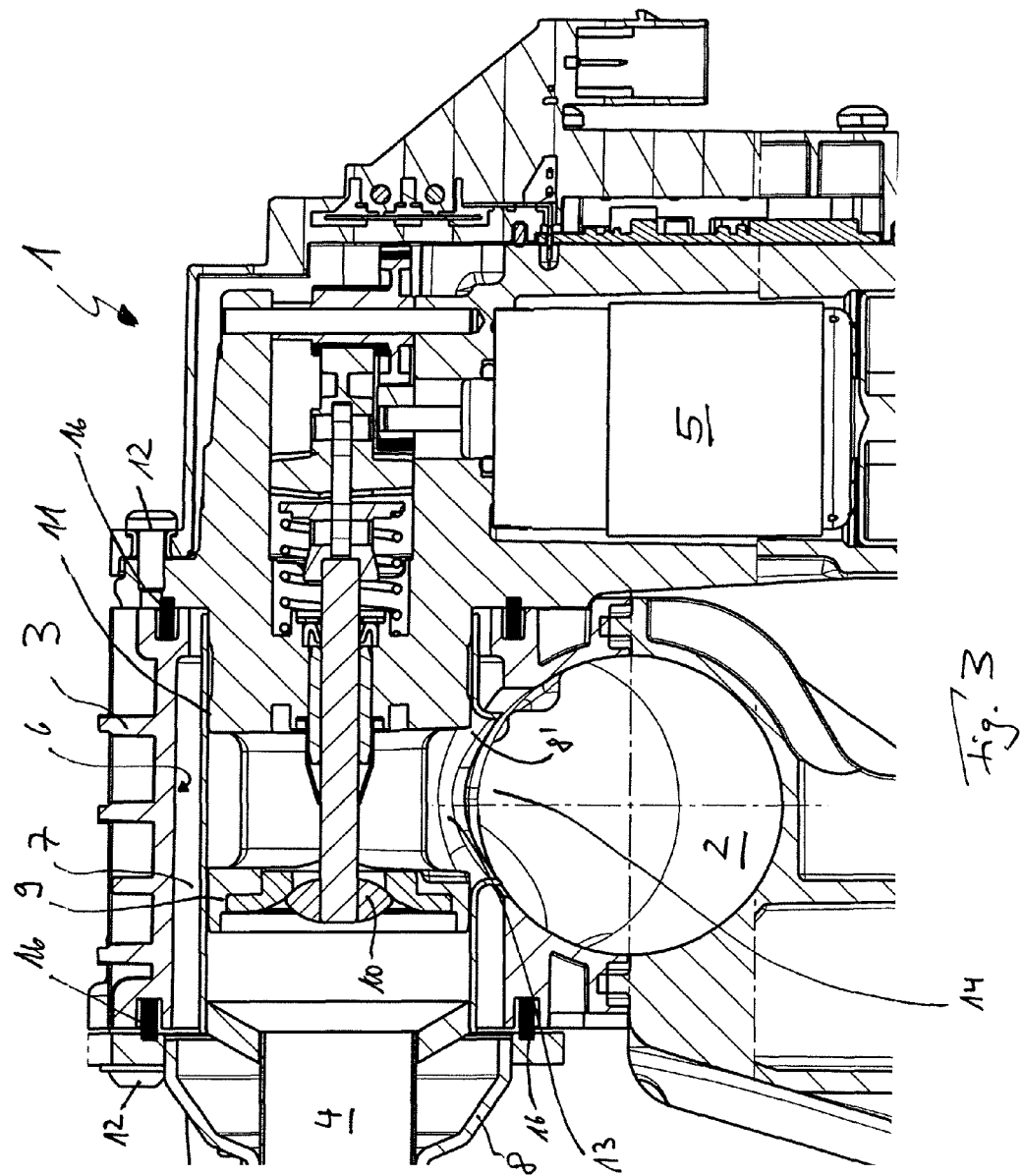
FIG. 3 shows schematically a sectional view of a connection region between a fresh air channel and the exhaust gas channel.

According to FIGS. 1 and 3, an intake module 1 according to the invention of a non-shown internal combustion engine, preferably in a motor vehicle, has an intake system consisting of a fresh air channel 2 and a coupling device 3, above which intake system, an exhaust gas channel 4 is attached. In the region of the coupling device 3 which, according to the invention, is formed from plastic, in particular polyamide (PA) or polypropylene (PP), thus a communicating connection between the exhaust gas channel 4 and the fresh air channel 2 is carried out. In addition, according to the invention, the coupling device 3 is formed for receiving an exhaust gas recirculation valve 5, by means of which a dosing of the exhaust gas to be recirculated in the fresh air flow is carried out. Furthermore, according to the invention, the exhaust gas channel 4 is connected with the coupling device 3 of the intake system in such a manner that a heat transfer is at least made difficult, preferably is almost completely prevented. Such a heat decoupling is necessary because the exhaust gas channel 4 becomes comparatively hot due to the high exhaust gas temperatures which, at least in case of long lasting exposure, could be damaging to the intake system's coupling device 3 formed from plastic.

To simplify the assembly of the intake module 1 according to the invention, the coupling device 3 has a cylindrical receptacle 6 in which from the one side, the exhaust gas channel 4, and from the other side, the exhaust gas recirculation valve 5 is inserted. It is in particular apparent from the FIGS. 1 and 3 that the exhaust gas channel 4 with its region projecting into the receptacle 6 of the coupling device 3 is nowhere in direct contact with the intake system's coupling device 3 formed from plastic, but is rather inserted into the receptacle 6 of the coupling device 3 thereby forming an annular gap 7 and is fastened, in particular screwed, to the coupling device 3 by means of a collar 8. The annular gap 7 surrounds the exhaust gas channel's 4 part engaging with the coupling device 3 of the intake system completely and is formed open towards the fresh air channel 2 on at least one position so that a ventilation of the annular gap 7 by the fresh air flowing through the fresh air channel 2 is possible.

As is apparent in particular from FIG. 1, the fresh air channel 2 and the exhaust gas channel 4 are crossing in the region of the coupling device 3 on different levels, in particular at a right angle. The exhaust gas recirculation valve 5 is inserted at least with its valve seat 9 into the exhaust gas channel's 4 region projecting into the coupling device 3 so that the exhaust gas channel 4 is closable by means of this inserted region, in particular by means of the valve seat 9 and a valve plate 10 movable relative thereto. The exhaust gas recirculation valve 5 is centered in the exhaust gas channel 4 or is aligned with respect to the same by its valve seat 9 and/or by an outer contour 11 axially spaced apart therefrom. A connection of the collar 8 and thus of the exhaust gas channel 4 with the coupling device 3 is carried out by means of a screw connection, wherein such a fastening is also conceivable for the opposite side, that is, for the fastening of the exhaust gas recirculation valve 5 to the coupling device 3. Of course, for fastening the exhaust gas channel 4 or the exhaust gas recirculation valve 5 to the coupling device 3, separate screws 12, but also a through bolt or threaded rod can be used.

Still viewing FIG. 1, it is apparent that the exhaust gas channel 4 has a wall opening 13 in its region inserted into the coupling device 3, which opening has an outwardly bent collar 8' which penetrates contactless at least in part into a corresponding opening 14 at the fresh air channel 2. The collar 8' is preferably formed as flow guiding element and redirects at least a portion of the fresh air flow flowing in the fresh air channel 2 into the annular gap 7 between the coupling device 3 and the exhaust gas channel 4 so that the annular gap 7 is forcibly ventilated and is thereby cooled particularly effectively. At the same time, the collar prevents an undesired penetration of hot exhaust gas into the annular gap 7.

Moreover, opposite to the opening 14 in the fresh air channel 2, a baffle element 15 can be arranged, by means of which a directly impacted wall of the fresh air channel 2 is protected against inflowing exhaust gas which is possibly hot. Of course, other solutions are also conceivable such as, for example, a spout that penetrates at least minimally into the fresh air channel 2.

The assembly of the intake module 1 according to the invention is significantly simplified since the exhaust gas channel 4 has simply to be inserted from opposite sides into the coupling device 3 of the intake system and subsequently, the exhaust gas recirculation valve 5 has to be inserted from the opposite side into the coupling device 3 and in particular into the exhaust gas channel 4. In doing so, the exhaust gas recirculation valve 5 penetrates at least partially into the exhaust gas channel 4. However, it is of particular advantage that the intake module 1 according to the invention can be delivered as a prefabricated, that is, completely assembled and leak-tested component to an assembly line which makes a subsequent assembling considerably simpler.

Figure 2:
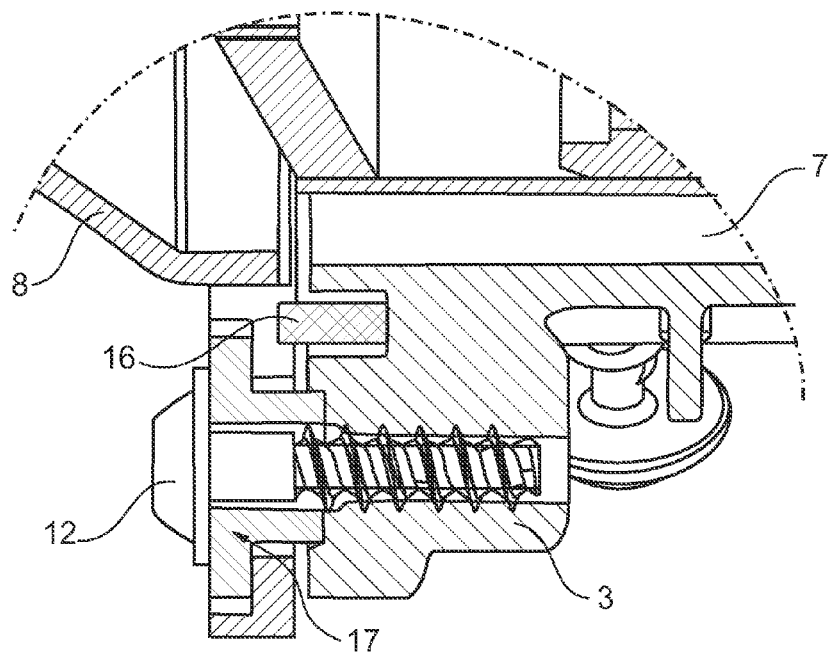
FIG. 2 shows schematically a detailed view of a mounting of an exhaust gas channel to a coupling device of an intake system.

Besides the annular gap 7, a special connection of the exhaust gas channel 4 with the coupling device 3 of the intake system provides also for a heat decoupling between these components, which is clearly shown in particular according to the FIGS. 1 and 2. In the region of the screw connection between the collar 8 of the exhaust gas channel 4 and the coupling device 3, a sealing/spacer element 16 is arranged which is preferably dimensioned in such a manner that a direct contact between the collar 8 and the coupling device 3 is not possible. Thus, an air gap is generated automatically, although only a small one, which provides for a heat decoupling as well. Moreover, also conceivable is the use of specific, thermally decoupled insert parts 17 (cf. FIG. 2) which reduce in particular a heat transfer between the screw 12 and the coupling device 3 of the intake system.

Moreover, of particular advantage for a simple assembly of the intake module 1 according to the invention is that the exhaust gas recirculation valve 5 does not have to be inserted gas-tight into the exhaust gas channel 4 since even a minor exhaust gas leakage into the annular gap 7 surrounding the exhaust gas channel 4 does not result in an emission into the environment since the annular gap 7 is sealed against the environment by means of the sealing/spacer elements 16 so that even undesired exhaust gas penetrated into the annular gap 7 can be conveyed from there via the flow taking place in the annular gap 7 into the fresh air channel 2 and from there into the combustion engine to be combusted. In general, the exhaust gas recirculation valve 5 should be mounted gas-tight within the exhaust gas channel 4. An internal leakage can be reduced by soldering the region of the exhaust gas channel 4 projecting into the receptacle 6 to the collar 8 or to an inserted seal. Between the exhaust gas recirculation valve 5 (in the front in the region of the valve seat 9) and the exhaust gas channel's 4 region projecting into the receptacle 6, a fit is to be provided or a sealing element is to be inserted (e.g. a bushing or an O-ring).

The special air cooling of the annular gap 7 makes in particular a water cooling unnecessary which has previously been used in this area and which is structurally complex and also expensive. A gap width is here preferably at least 1 mm. In general, in particular in the region of its collar 8 or in its region projecting into the coupling device 3, the exhaust gas channel 4 can be formed as one piece or as two pieces. In general, with the intake module 1 according to the invention, an expensive aluminum cast housing which has previously been used in this area can be saved, which not only reduces the manufacturing costs but also the maintenance costs because the intake module 1 according to the invention is considerably simpler to assemble or to disassemble. Of essential advantage is, however, that the intake module 1 according to the invention, which is introduced herein, can be prefabricated, wherein in particular a subsequent assembly on a production line can be performed simpler or can be streamlined.

The invention claimed is:

1. An integrated exhaust gas recirculation intake module, comprising:
   an intake system including a fresh air channel; and a coupling device;
   wherein the coupling device is configured to receive an exhaust gas recirculation valve;
   wherein the coupling device is configured to connect an exhaust gas channel with a fresh gas channel;
   wherein the exhaust gas channel is connected with the coupling device such that a heat transfer between the exhaust gas channel and the coupling device is hindered;
   wherein the exhaust gas channel is inserted into the coupling device thereby forming an annular gap between the exhaust gas channel and the coupling device, and is fastened to the coupling device by a collar; and
   wherein the annular gap is formed open towards and vented by the fresh air channel.

2. The integrated exhaust gas recirculation intake module according to claim 1, wherein the intake system is a plastic injection molding part formed as at least one of a single and a plurality of parts.

3. The integrated exhaust gas recirculation intake module according to claim 1, wherein the coupling device has a cylindrical receptacle, and wherein exhaust gas channel is inserted from one side and the exhaust gas recirculation valve is inserted from an opposite side.

4. The integrated exhaust gas recirculation intake module according to claim 1, wherein the fresh air channel and the exhaust gas channel cross one another generally orthogonally at different levels in the region of the coupling device.

5. The integrated exhaust gas recirculation intake module according to claim 1, wherein the exhaust gas recirculation valve is inserted with a valve seat into the exhaust gas channel.

6. The integrated exhaust gas recirculation intake module according to claim 5, wherein the exhaust gas recirculation valve is centered in the exhaust gas channel by at least one of the valve seat and an outer contour axially spaced apart therefrom.

7. The integrated exhaust gas recirculation intake module according to claim 1, wherein the exhaust gas recirculation valve and the exhaust gas channel are at least one of each screwed separately and by common fasteners to the coupling device.

8. The integrated exhaust gas recirculation intake module according to claim 1, wherein the exhaust gas channel has a wall opening with an outwardly bent collar in the region inserted into the coupling device, and wherein the outwardly bent collar penetrates contactless at least partially into a corresponding opening at the fresh air channel.

9. The integrated exhaust gas recirculation intake module according to claim 8, wherein the collar is formed as a flow guiding element and redirects a portion of the fresh air flow flowing in the fresh air channel into the annular gap between the coupling device and the exhaust gas channel.

10. The integrated exhaust gas recirculation intake module according to claim 8, wherein a baffle element is arranged in the fresh air channel in the region of the opening.

11. The integrated exhaust gas recirculation intake module according to claim 1, wherein the intake system is formed from at least one of a polyamide (PA) and a polypropylene (PP).

12. A prefabricated intake module, comprising:
   an intake system including a fresh air channel, and a coupling device mounted to an exhaust gas recirculation valve; and
   an exhaust gas channel fastened indirectly to the coupling device via a collar such that the exhaust gas channel and the coupling device are not in direct contact with each other;
   wherein the exhaust gas channel is inserted into the coupling device thereby forming an annular gap between the exhaust gas channel and the coupling device, the annular gap being formed open towards and vented by the fresh air channel.

13. The integrated exhaust gas recirculation intake module according to claim 1, wherein the fresh air channel and the coupling device are formed of plastic.

14. The integrated exhaust gas recirculation intake module according to claim 2, wherein the coupling device has a cylindrical receptacle in which the exhaust gas channel is inserted from one side and the exhaust gas recirculation valve is inserted from an opposite side.

15. An integrated exhaust gas recirculation intake module, comprising:
   an intake system including a fresh air channel; and a coupling device;
   wherein the coupling device is configured to receive an exhaust gas recirculation valve;
   wherein the coupling device is configured to connect an exhaust gas channel with a fresh gas channel;
   wherein the exhaust gas channel is connected with the coupling device such that a heat transfer between the exhaust gas channel and the coupling device is hindered;
   wherein the exhaust gas channel is inserted into the coupling device thereby forming an annular gap between the exhaust gas channel and the coupling device, and is fastened to the coupling device by a collar;
   wherein the exhaust gas channel has a wall opening with an outwardly bent collar in the region inserted into the coupling device, and wherein the outwardly bent collar penetrates contactless at least partially into a corresponding opening at the fresh air channel; and
   wherein the collar is formed as a flow guiding element and redirects a portion of the fresh air flow flowing in the fresh air channel into the annular gap between the coupling device and the exhaust gas channel.

* * * * *